United States Patent [19]

Hahne et al.

[11] Patent Number: 5,356,166
[45] Date of Patent: Oct. 18, 1994

[54] ARRESTABLY LOCKABLE TELESCOPING TOW-BAR ASSEMBLY

[75] Inventors: Merton K. Hahne, Coleridge; William A. Bachman, Pender, both of Nebr.

[73] Assignee: Automatic Equipment Mfg. Co., Pender, Nebr.

[21] Appl. No.: 89,445

[22] Filed: Jul. 12, 1993

[51] Int. Cl.⁵ .............................................. B60D 1/167
[52] U.S. Cl. .................. 280/491.4; 403/325; 403/DIG. 4
[58] Field of Search .............. 280/491.4, 491.2, 491.1; 403/325, 321, 324, DIG. 4, DIG. 6

[56] References Cited

U.S. PATENT DOCUMENTS

| | | | |
|---|---|---|---|
| 3,260,541 | 7/1966 | Sadler et al. | 403/325 |
| 4,198,080 | 4/1980 | Carpenter | 403/325 |
| 4,645,372 | 2/1987 | Suzuki | 403/325 |
| 4,856,805 | 8/1989 | Davis | 280/491.4 |
| 4,957,387 | 9/1990 | Nasu | 403/325 |
| 4,960,344 | 10/1990 | Geisthoff et al. | 403/325 |
| 5,071,153 | 12/1991 | Duncan | 280/491.4 |
| 5,141,355 | 8/1992 | Stillwagon | 403/325 |
| 5,224,960 | 7/1993 | Duncan | 280/491.4 |

FOREIGN PATENT DOCUMENTS

| | | | |
|---|---|---|---|
| 844457 | 6/1970 | Canada | 280/491.4 |
| 1171112 | 7/1984 | Canada | 280/491.4 |
| 482551 | 5/1972 | U.S.S.R. | 403/DIG. 4 |

Primary Examiner—Margaret A. Focarino
Assistant Examiner—Kevin Hurley
Attorney, Agent, or Firm—George R. Nimmer

[57] ABSTRACT

An improved locking mechanism for an arrestably lockable telescoping tow bar assembly comprises a slidable latch member surrounding balls-containing sideward openings of an outer tube that are radially alignable with an outside groove of a telescopingly associated inner tube, the slidable latch member including a medial cam portion slidably surrounding the outer tube between a surrounding retainer ring augmentation therefor and the balls-containing sideward openings therefor; a cover slidably surrounding a trailward part of the slidable latch member and being trailwardly immovable along the outer tube; and a helical spring means acutatably extending between the cover member and the slidable latch member.

5 Claims, 7 Drawing Sheets

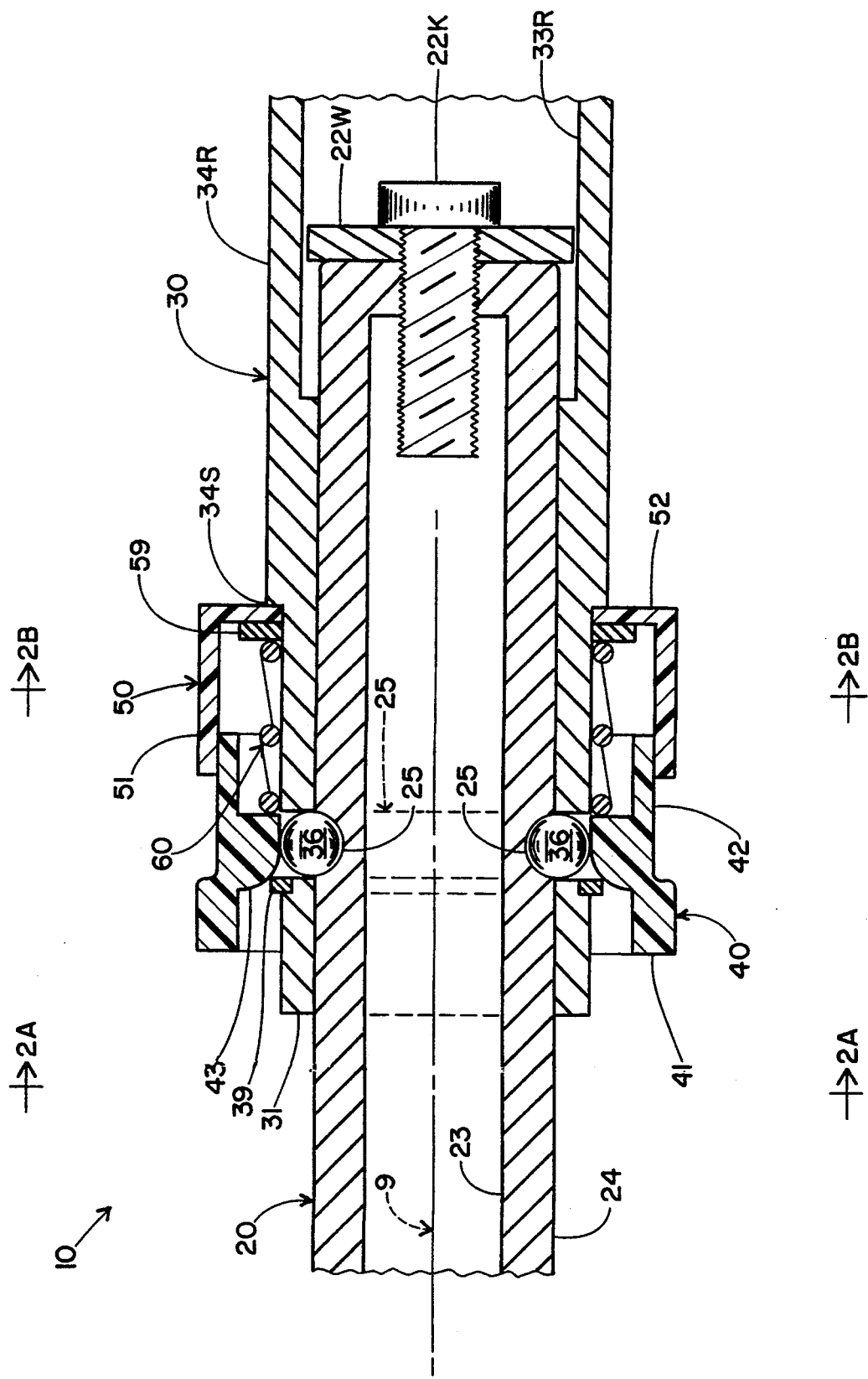

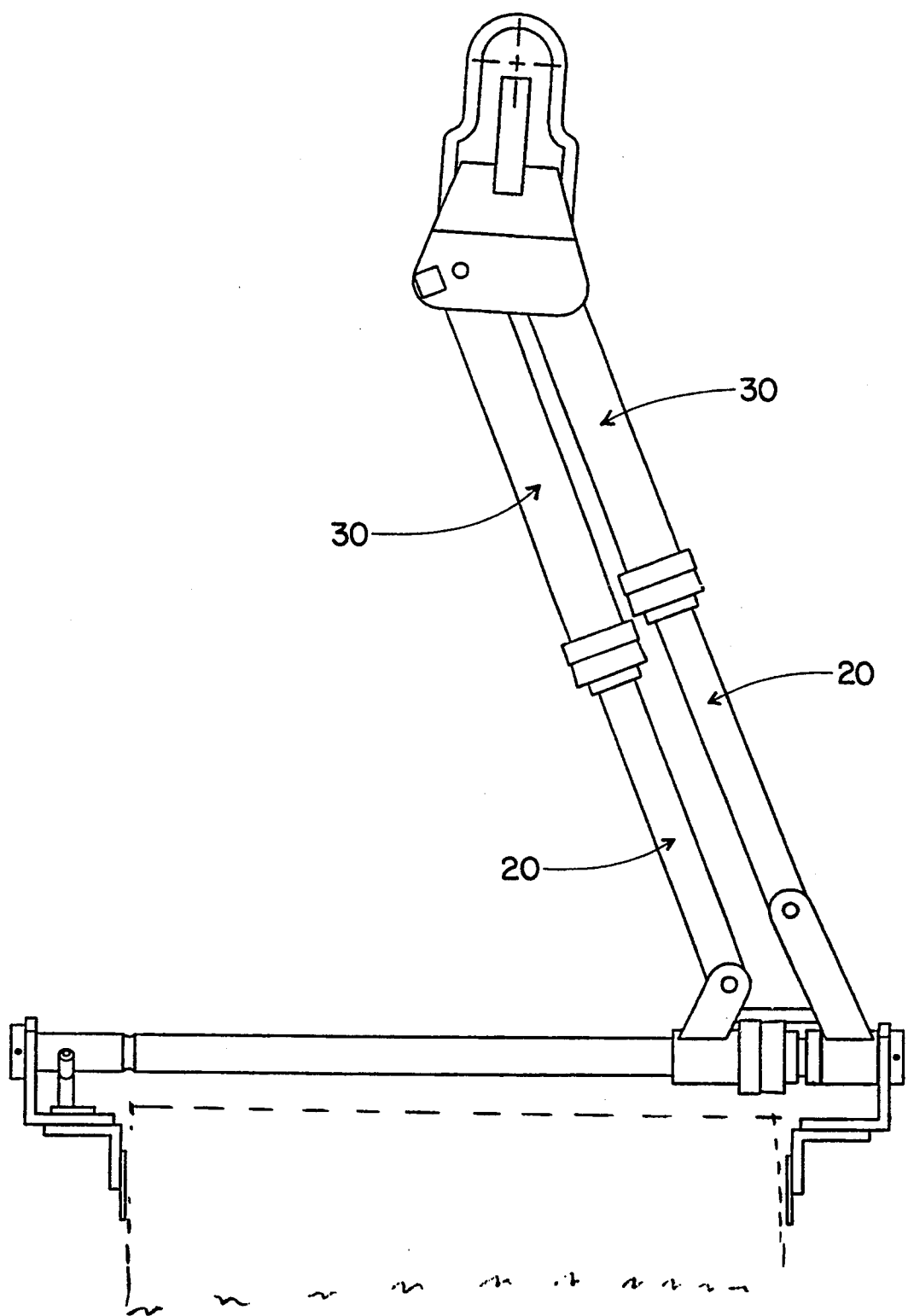

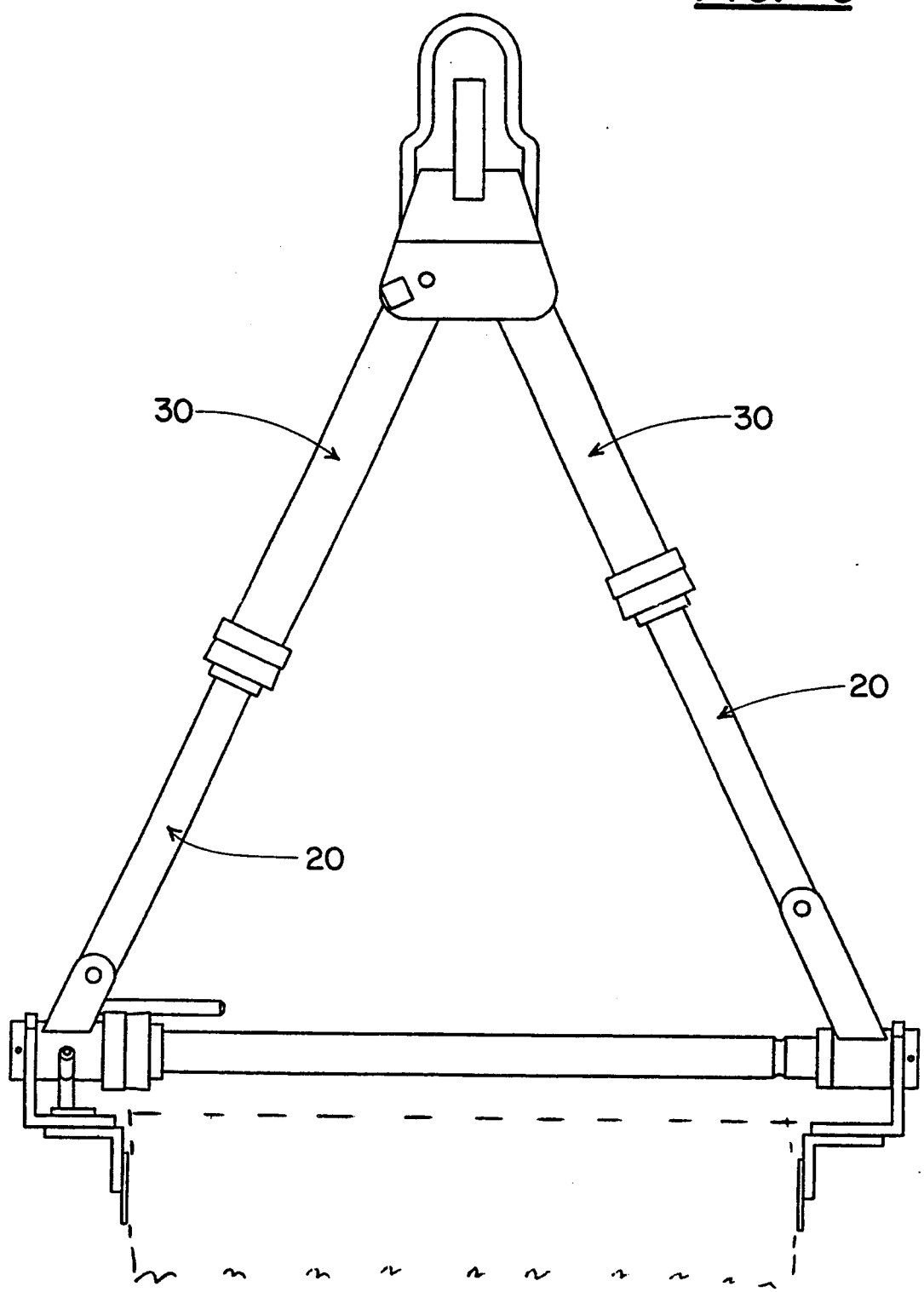

ARRESTABLY LOCKABLE TELESCOPING TOW-BAR ASSEMBLY

BACKGROUND OF THE INVENTION

Applicants herein are aware of prior art "Arrestably Lockable Telescoping Tow-Bar Assemblies" disclosed in U.S. Pat. Nos. 4,856,805 (Davis - Aug. 15, 1989) and 5,071,153 (Duncan - Dec. 10, 1991). In Davis' U.S. Pat. No. 4,856,805, there are manually laborious, structurally cumbersome, and uneconomical locking-pins arresting means employed for arresting the towing state condition between an elongate inner-tube and an elongate telescoping outer-tube. In Duncan's U.S. Pat. No. 5,071,153, there are manually laborious, structurally cumbersome, and uneconomical limit-pins arresting means employed for arresting the towing-state condition between an elongate inner-tube an a telescopically associated elongate outer-tube.

Generally analagous to the aforedescribed disclosures of the Davis and Duncan Patents, the:

- herewith appended drawing FIG. 3 is analagous to drawing FIGS. 4 and 3 of U.S. Pat. Nos. 4,856,805 and 5,071,153, respectively, and herein analagously showing a "telescoping tow-bar assembly" wherein an inner-tube (20) and a slidably associated outer-tube (30) are in the storable-state collapsed condition rearwardly against a towed vehicle;
- herewith appended drawing FIG. 4 is: analagous to drawing FIGS. 3 and 2 of U.S. Pat. Nos. 4,856,805 and 5,071,153, respectively, and herein analagously showing a "telescoping tow-bar assembly" wherein the inner-tube (20) and a slidably associated outer-tube (30) are in an unlocked transitory intermediate-state condition located forwardly away from a towed-vehicle; and
- herewith appended drawing FIG. 5 is analagous to drawing FIGS. 1 and 1 of U.S. Pat. Nos. 4,856,805 and 5,071,153, respectively, and herein analagously showing a "telescoping tow-bar assembly" wherein the inner-tube (20) and a slidably associated outer-tube (30) are in the locked towing-condition (forwardly away from the towed vehicle) by virtue of a novel inter-tubes locking means (35-60) herein.

GENERAL OBJECTIVE OF THE INVENTION

It is the general objective of the present invention to provide "Arrestably Lockable Telescoping Tow-Bar Assemblies" wherein the releasable locking means between the inner-tube and telescopingly associated outer-tube components thereof is not fraught with the manually laborious, structurally cumbersome, and uneconomical disadvantages associated with those of related prior art teachings.

GENERAL STATEMENT OF THE INVENTION

With the aforementioned general objective in view, and together with other related and specific objectives which will become more apparent as this description proceeds, the "Arrestably Lockable Telescoping Tow-Bar Assemblies" concept of the present invention generally comprises: an inner-tube having an outer-surface surrounding a longitudinally extending central-axis and having a trail-end transversely intersecting said central-axis and said outer-surface being provided with an inward-groove (25) concentric about the central-axis; an outer-tube having a transverse leadward-end and having (adjacent to said leadward-end) an outward-surface surrounding said central-axis and an inward-surface slidably surrounding the inner-tube outer-surface, the outer-tube being provided with said finite-plurality of sideward-openings therethrough that are radially and transversely alignable with said inner-tube's outer-surface's circular inward-groove, each said sideward-opening being provided with a spherical ball whose diameter exceeds the radial dimension between the outer-tube's outward-surface and inward-surface, and said outer-tube being externally leadwardly provided with a surrounding retainer ring; a slidable latch member permanently surrounding the outer-tube balls-containing sideward-openings and including a radially inwardly extending medial cam portion permanently located trailwardly of the retainer ring and slidably surrounding the outer-tube outward-surface; a cover having a leading-part permanently slidably surrounding the slidable latch member trailward-part and being trailwardly immovably restrained along the outer-tube; and spring means actuatably extending between the cover member and the medial cam portion of the slidable latch member.

BRIEF DESCRIPTION OF THE DRAWING

In the drawing, wherein like characters refer to like parts in the several views, and in which:

FIG. 1 is also indicated along lines 1—1 of FIGS. 3 and 4;

FIG. 2 is a directionally longitudinally extending sectional elevational view of said representative embodiment (10) but at the locked condition thereof and taken along line 2—2 of FIG. 2A. FIG. 2 is also indicated along lines 2—2 of FIG. 5;

FIG. 4 (aforedescribed) is a top plan view of the FIG. 3 vehicular tow-bar system at an intermediate-state wherein the system inner-tubes (20) and outer-tubes (30) are in a non-arrested condition; and FIG. 5 (aforedescribed) is a top plan view of the FIG. 3 vehicular tow-bar system at a vehicular towing-state wherein the system inner-tubes (20) and outer-tubes (DO) are in a directionally-arrested locked condition.

DETAILED DESCRIPTION OF THE DRAWING

Figure 1:
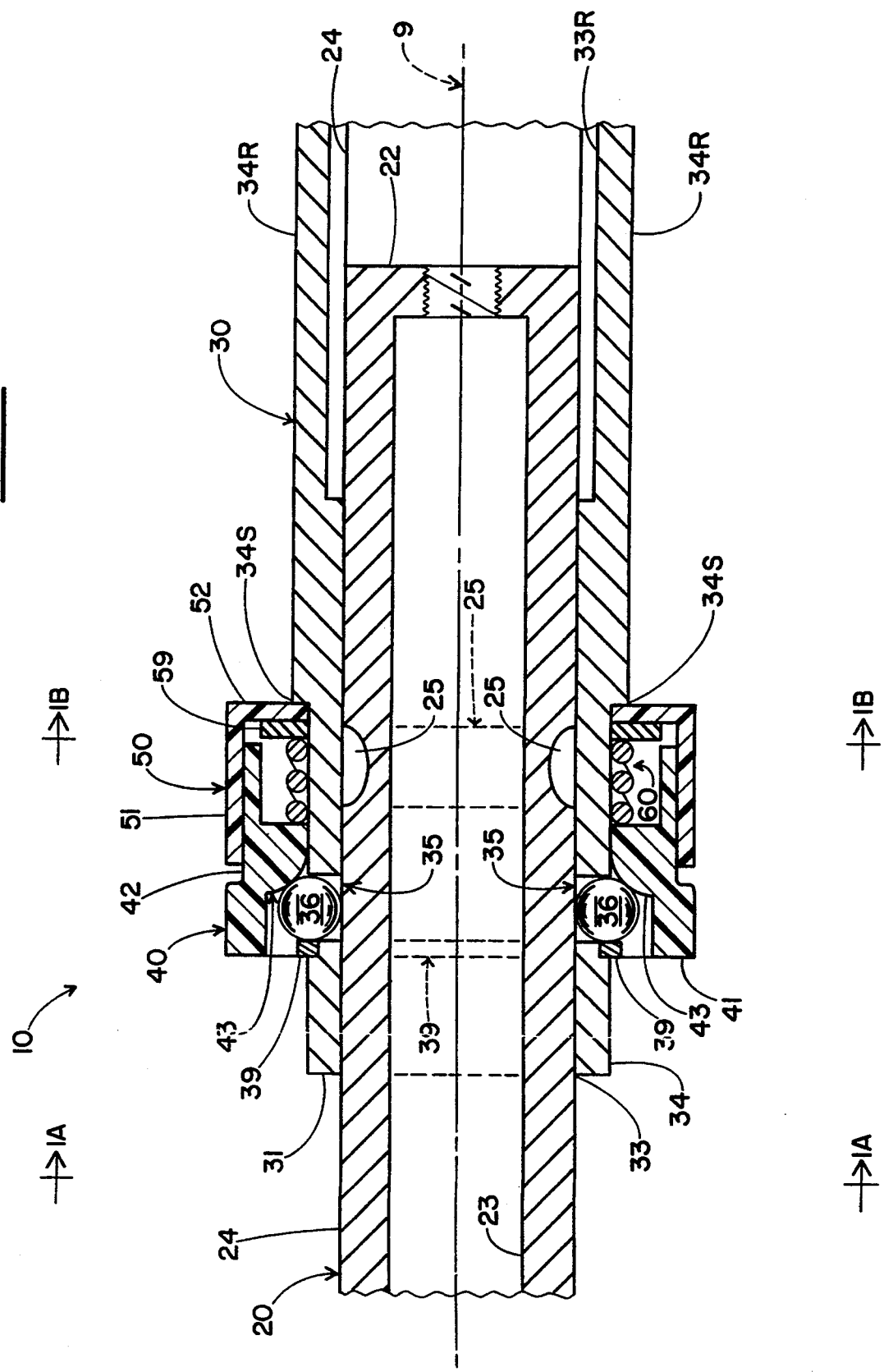
FIG. 1 is a directionally longitudinally extending sectional elevational view of a representative embodiment (10) of the "arrestably lockable telescoping tow-bar assembly" at the unlocked condition thereof and taken along lines 1—1 of FIG. 1A.
Figure 1A:
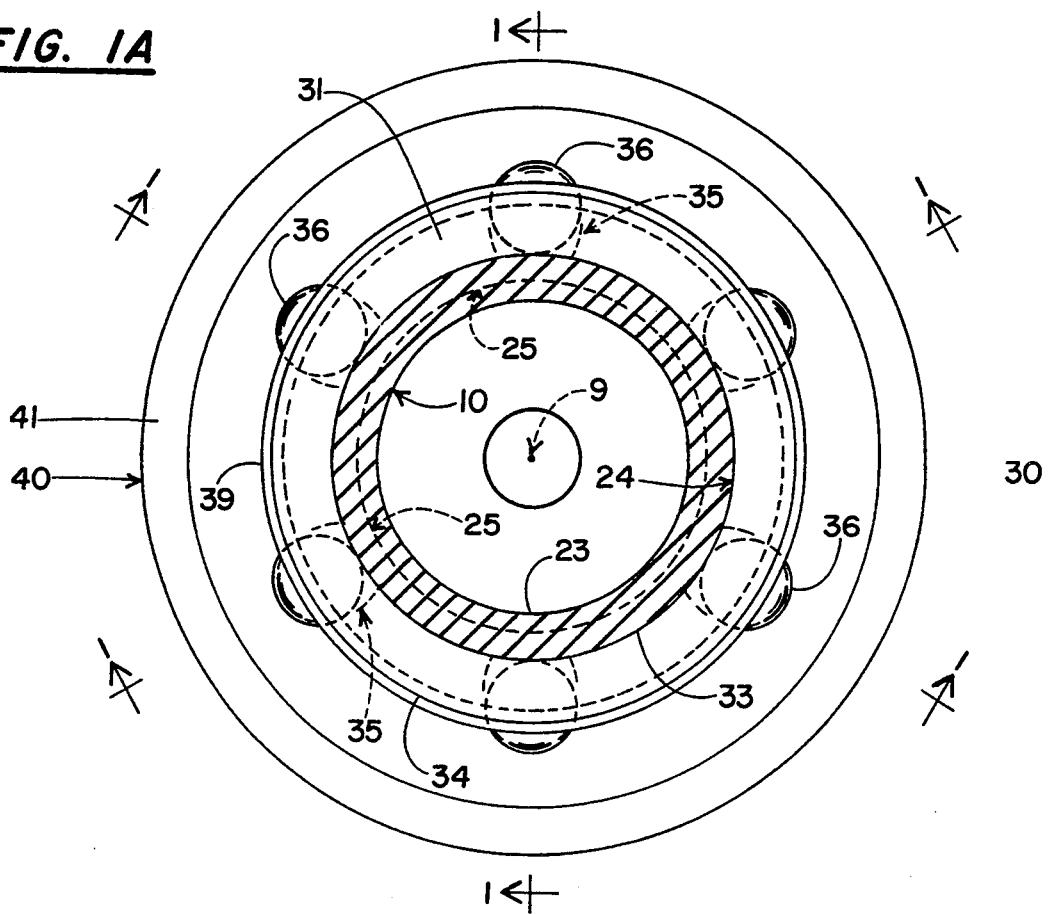
FIG. 1A is a directionally transversely extending sectional elevational view taken along line 1A—1A of FIG. 1.
Figure 1B:
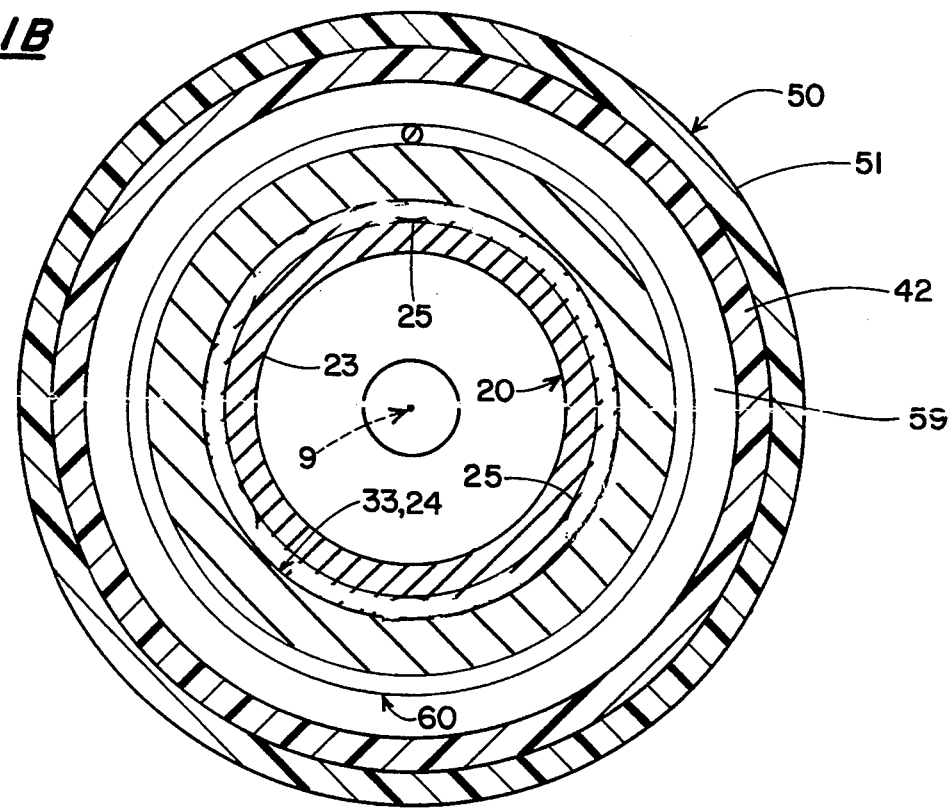
FIG. 1B is a directionally transversely extending sectional elevational view taken along line 1B—1B of FIG. 1.

Referring initially to drawing FIGS. 1, 1A, and 1B, which refer to the "arrestably lockable telescoping tow-bar assembly" (10) of the present invention wherein the novel inner-tube (20) and the novel outer-tube (30) are in the non-arrested unlocked condition, and as specifically described in the ensuing four paragraphs:

The novel inner-tube (20) herein has an outer-surface 24 circularly surrounding a directionally longitudinally extending central-axis 9 and having a trail-end 22 that directionally transversely intersects said central-axis 9 and also a directionally transverse lead-end. There is an inner-surface 23 circularly surrounding central-axis 9. The said outer-surface 24 is radially inwardly provided with an inward-groove 25 that circularly surrounds central-axis 9 and that lies in a plane directionally perpendicularly transverse to central-axis 9.

The novel outer-tube (30) herein generally circularly surrounds said central-axis 9 and has a directionally transverse leadward-end 31 and also a directionally transverse trailward-end. Extending directionally longitudinally and trailwardly from leadward-end is an inward-surface portion 33 slidably surrounding inner-tube outer-surface 24 and an outward-surface 34 circularly surrounding inward-surface portion 33. Preferably, the outer-tube (30) has a radially outwardly disposed trailing portion 34R that abruptly intersects leading portion 34 at a vertically abrupt shoulder 34S. And also preferably, the outer-tube has a radially outwardly disposed trailing portion 33R located radially outwardly of inward-surface portion 33. Novel outer-tube 30 is provided with a said finite-plurality (e.g. 6 in number) of sideward-openings 35 therethrough and similarly regularly arrayed about central-axis 9 and in a plane directionally transverse to central-axis 9. Within each said sideward-opening is loosely disposed a spherical ball 36 whose diametrical dimension slightly exceeds the radial distance between surfaces 33 and 34. Between leadward-end 31 and said directionally transversely arrayed side-ward-openings 35 (and preferably located immediately leadwardly alongside said sideward-openings 35 and enclosed spherical balls 36) is a retainer ring 39 that both inwardly and outwardly circularly surrounds outer-surface portion 34.

There is a slidable latch member 40 that surrounds outer-tube outer-surface portion 34 and sideward-openings 35 and including directionally longitudinally extendings leadward-part 41 and trailward-part 42, both being disposed radially outwardly about outward-surface portion 34, and also including a medial cam portion 43 that is permanently located trailwardly of said retainer ring 39 and that slidably surrounds the outer-tube outward-surface portion 34 (only between retainer ring 39 and spherical balls 36).

There is a cover member 50 having a longitudinally extending leading-part 51 that always slidably surrounds the slidable latch trailward-part 42 and which cover member is directionally longitudinally immovable along outer-tube 30. In the latter vein, cover member 50 might have an upright portion 52 (depending from leading part 51) and abutting against said shoulder portion 34S.

There are helical spring means (60), or similarly longitudinal yieldable spring means, extending between the immobile part of cover member 50 and the slide latch member. For example, a washer member 59 might surround outer-tube surface portion 34 and provide a bearing surface between helical spring 60 and latch member 65 cam portion 43.

Figure 2A:
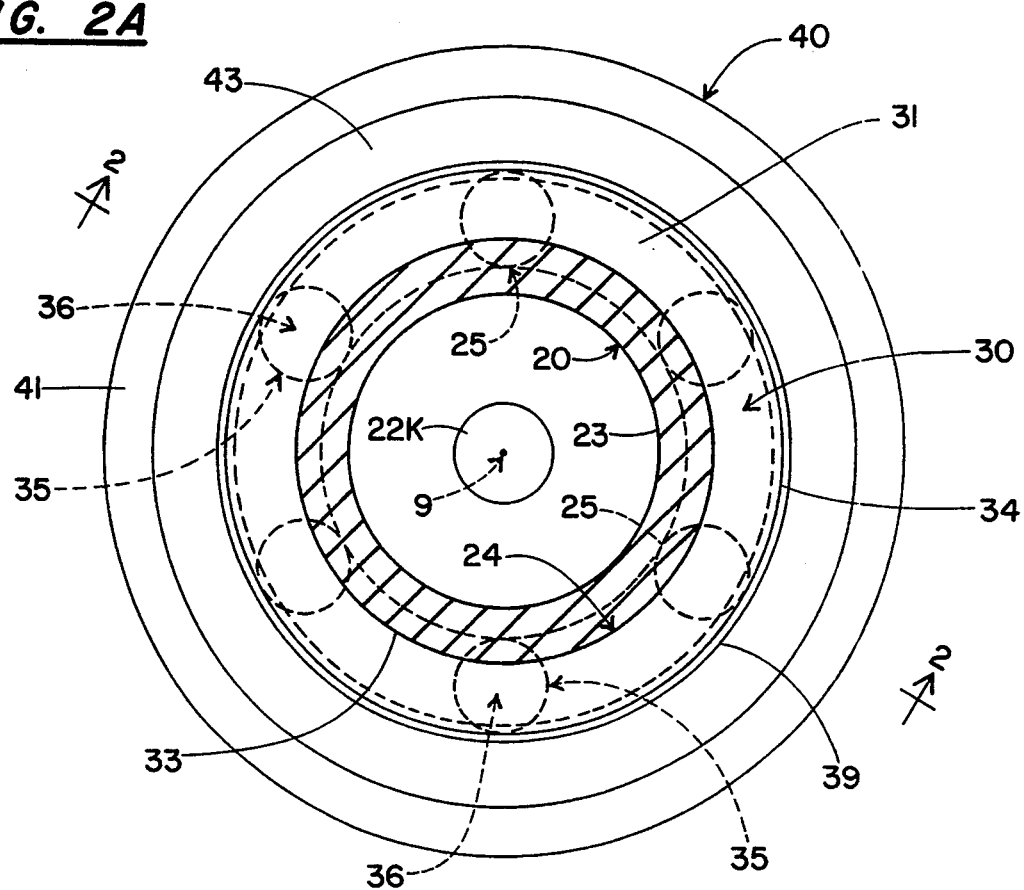
FIG. 2A is a directionally transversely extending sectional elevational view taken alone line 2A—2A of FIG. 2.
Figure 2B:
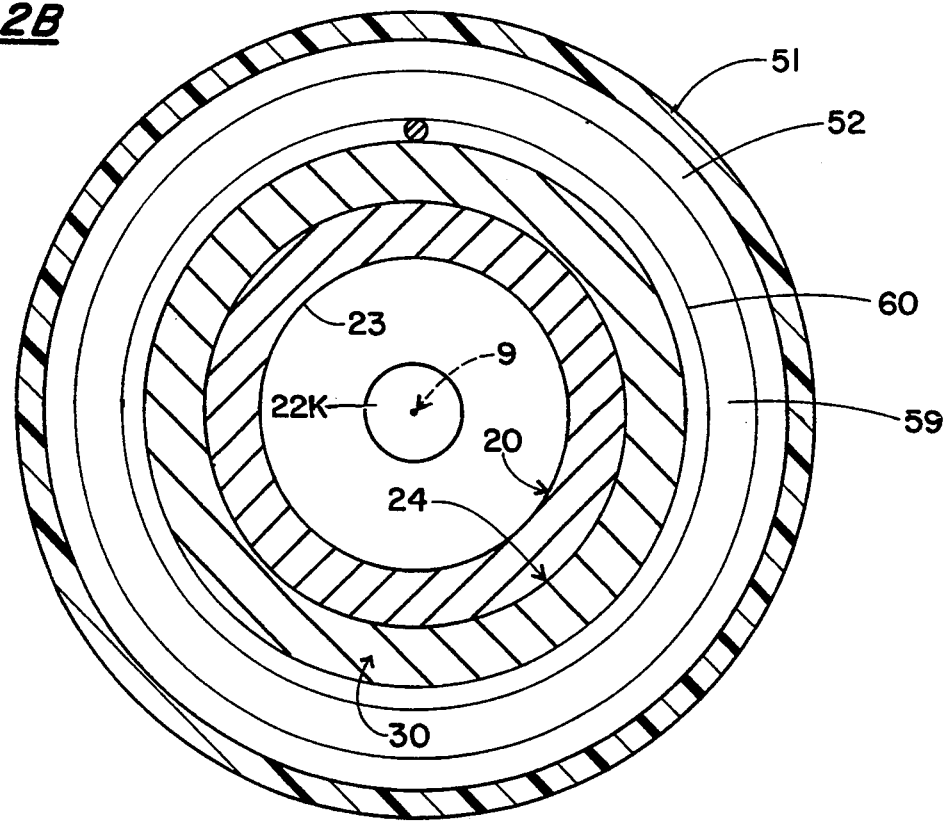
FIG. 2B is a directionally transversely extending sectional elevational view taken along line 2B—2B of FIG. 2.

In view of the foregoing description of drawing FIGS. 1–1B for the "arrestably lockable tow-bar assembly (10)" at the non-arrested unlocked condition between inner-tubes(20) and outer-tubes(30) and appropriate to a non-towing intermediate-state (FIG. 4) between towing-vehicle and towed-vehicle: It will be seen from said described drawing FIGS. 1–1B and now from drawing FIGS. 2–2B that, as a hitched towing-vehicle causes the telescoping outer-tubes to convergently slide toward a towing-vehicle, the slidable latch member cam portion 43 downwardly forces the spherical balls 36 into inner-tube outward-groove 25 into an arrested locked condition between tubes 20 and 30 to appropriately attain a vehicular towing-state (FIG. 5). And conversely, to return tubes 20 and 30 from their towing-state (FIG. 5) to their intermediate-states (FIG. 4) disengageably away from a towing-vehicle: the operator manually presses the slidable latch member 40 (including its integral cam portion 43) toward the longitudinally restrained (34S) cover member (50) which pressure permits spherical balls 36 to "float" within outer-tube sideward-openings 35, whereby tubes 20 and 30 can freely return from the towing-state (FIG. 5) to the intermediate-state (FIG. 4).

Figure 3:
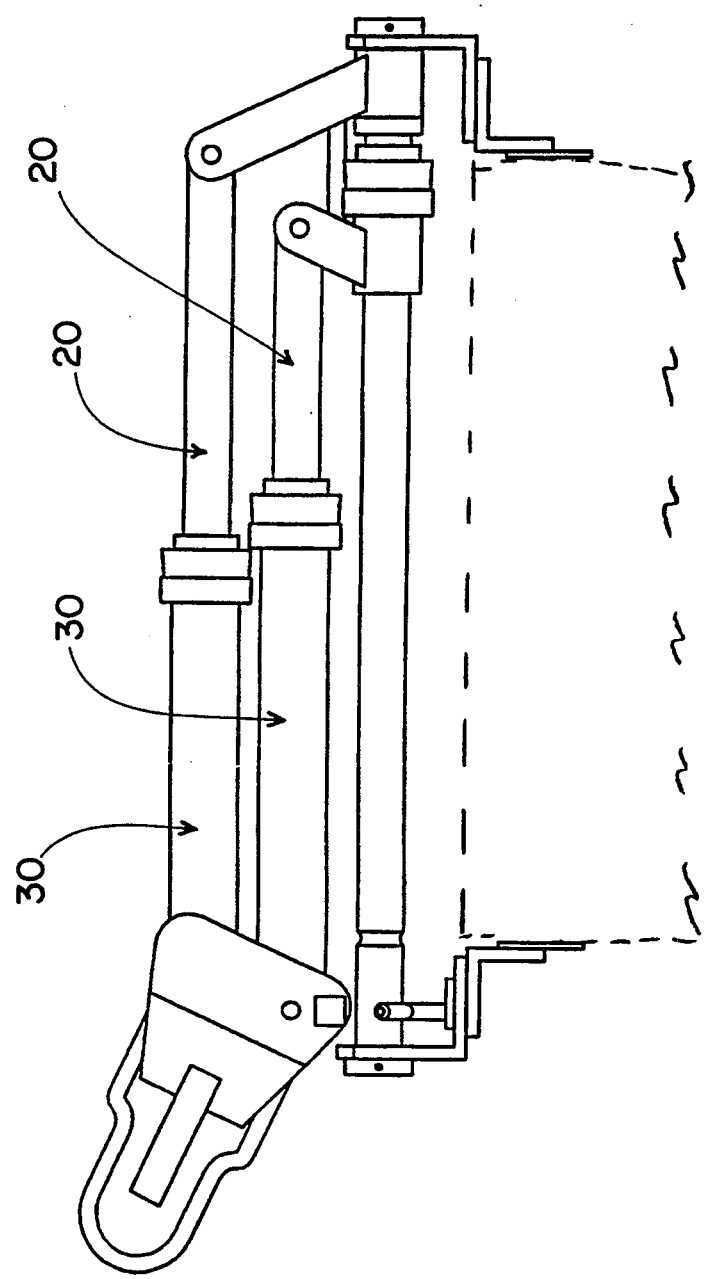
FIG. 3 (aforedescribed) is a top plan view of a vehicular tow-bar system at its storable-state located adjacent the frontal-end of a towable vehicle wherein the system inner-tube (20) and outer-tubes (30) are in the non-arrested unlocked condition.

The structure and operation alluded to in the immediately preceeding five paragraphs and analagously applicable to the vehicular horizontal base-member portion of arrestably lockable vehicular tow-bar assemblies (e.g. FIG. 3 herein).

Preferably, there are directionally longitudinally extending "safety means" between the inner-tube and outer-tube of the towing-assembly's forwardly convergeable first-bar and second-bar. Such "safety means" ensures against disengagement of the respective inner-tubes and outer-tubes at the arrestably-locked condition (e.g. FIG. 5) therebetween. For example, a centrally-perforate-washer 22W might surround central-axis 9 and abuttably against the inner-tube trail-end 22 and held thereagainst by a threaded member 22K. The radially extending extent of said threadedly-held centrally-perforate-washer 22W is located radially outwardly of inner-tube outer-surface 24 and radially nearby the outer-tube trailing portion 33R.

From the foregoing, the construction and operation of the arrestably lockable tow-bar assembly will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. Arrestably Lockable Telescoping Tow-Bar Assembly comprising:

(A) an inner-tube having an outer-surface concentrically surrounding a directionally longitudinally extending central-axis and having a trail-end directionally transversely intersecting said central-axis, said outer-surface being provided with at least one radially inwardly extending inward-groove circularly surrounding said central-axis and located in a plane perpendicular to said central-axis;

(B) an outer-tube having a leadward-end directionally transversely intersecting said central-axis and having an outward-surface surrounding said central-axis and an inward-surface slidably surrounding said inner-tube outward-surface, said outer-tube being provided with a finite-plurality of equiangularly-spaced sideward-openings therethrough that are radially and directionally transversely alignable with said inner-tube's outer-surface inward-groove, each said sideward-opening being provided with a spherical ball whose diameter slightly exceeds the radial dimension between the outer-tube outward-surface and inward-surface, and said outer-tube between a leadward-end thereof and said transversely aligned balls-provided sideward-openings being externally provided with a retainer ring that surrounds and extends directionally radially outwardly beyond said outer-tube outward-surface;

(C) a slidable latch member permanently surrounding said outer-tube balls-provided sideward-openings and including a leadward-part and a trailward-part radially outwardly spaced from the outer-tube outward-surface and further including a medially-located cam portion permanently located trailwardly of said retainer ring and slidably surrounding said outer-tube outward-surface;

(D) a cover having a leading-part slidably surrounding the slidable latch member trailward-part and being directionally trailwardly immovably restrained along the outer-tube; and (E) helical spring means surrounding the outer-tube and actuatably extending directionally longitudinal between the cover member and the slidable latch member medially-located cam portion.

2. The assembly of claim 1 wherein a cover trailward-part immovably abuts an upright-shoulder portion of the outer-tube.

3. The assembly of claim 2 wherein the helical spring means actuatably extends between the slidable latch member medial cam portion and a said cover member's immovably restrained trailward-part.

4. The assembly of claim 1 wherein the retainer ring is located at said radially extending and transversely aligned array of outer-tube sideward-openings; and wherein said sideward-openings are spaced at equal angular increments about said externally grooved portion of the inner-tube.

5. The assembly of claim 3 wherein the outer-tube inward-surface includes a trailward-surface portion that is spaced radially outwardly away from the inner-tube outer-surface; and wherein the inner-tube at the trail-end thereof is provided with a centrally-perforate-washer flange means extending radially outwardly from the inner-tube outer-surface but which flange means is surrounded by the outer-tube trail-ward-surface, whereby there is provided a "safety means" between the telescoping inner-tube and outer-tube.

* * * * *